United States Patent
Dan

(10) Patent No.: US 8,422,441 B2
(45) Date of Patent: Apr. 16, 2013

(54) MOBILE COMMUNICATION DEVICE AND MOBILE COMMUNICATION SYSTEM

(75) Inventor: Xu Dan, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 648 days.

(21) Appl. No.: 12/632,947

(22) Filed: Dec. 8, 2009

(65) Prior Publication Data

US 2010/0246507 A1    Sep. 30, 2010

(30) Foreign Application Priority Data

Mar. 30, 2009    (JP) ................................. 2009-080862

(51) Int. Cl.
*H04W 4/00*    (2009.01)
(52) U.S. Cl.
USPC ......................................... 370/329; 375/260
(58) Field of Classification Search .................. 370/329; 375/260
See application file for complete search history.

(56) References Cited

U.S. PATENT DOCUMENTS

| | | | | |
|---|---|---|---|---|
| 7,031,300 | B1* | 4/2006 | Fraas et al. ..................... | 370/352 |
| 7,609,610 | B2* | 10/2009 | Abe et al. ....................... | 370/204 |
| 7,778,247 | B2* | 8/2010 | Green ............................ | 370/389 |
| 2004/0097240 | A1 | 5/2004 | Chen et al. | |
| 2004/0172907 | A1 | 9/2004 | Krantz-Lilienthal et al. | |
| 2005/0113028 | A1 | 5/2005 | Uchida et al. | |
| 2005/0286422 | A1* | 12/2005 | Funato ........................... | 370/235 |
| 2008/0095123 | A1* | 4/2008 | Kuroda et al. ................. | 370/336 |
| 2009/0059856 | A1* | 3/2009 | Kermoal et al. ............... | 370/329 |
| 2009/0059891 | A1* | 3/2009 | Sakoda et al. ................. | 370/348 |
| 2009/0201875 | A1* | 8/2009 | Hasegawa et al. ............. | 370/329 |
| 2009/0268680 | A1* | 10/2009 | Nam et al. ..................... | 370/329 |
| 2010/0135236 | A1* | 6/2010 | Wang et al. .................... | 370/329 |
| 2010/0246706 | A1* | 9/2010 | Kim et al. ...................... | 375/267 |
| 2011/0103335 | A1* | 5/2011 | Golitschek Edler von Elbwart et al. .............................. | 370/329 |
| 2011/0107169 | A1* | 5/2011 | Lohr et al. ..................... | 714/748 |

FOREIGN PATENT DOCUMENTS

| | | |
|---|---|---|
| JP | 2002-300644 | 10/2002 |
| JP | 2004-172907 | 6/2004 |
| JP | 2005-159486 | 6/2005 |

* cited by examiner

*Primary Examiner* — Brandon Renner
*Assistant Examiner* — Faisal Choudhury
(74) *Attorney, Agent, or Firm* — Antonelli, Terry, Stout & Kraus, LLP.

(57) ABSTRACT

A base station includes a unit that, in response to a request from a terminal to activate an application, calculates the data communication speed based on a communication quality index received from the terminal; a unit that performs the statistical calculation of traffic sent to terminals; a unit that calculates the statistical value of the number of free resource blocks; a unit that calculates the estimated continuation time of the data communication speed, calculated by the data communication speed calculation unit, from the statistical value of free resource blocks calculated by the free resource blocks conversion unit; and a unit that sends the data communication speed and the continuation time to the terminal, and each terminal displays the data communication speed and the continuation time, sent from the mobile communication device, on a display unit and, based on the selection result of a user, controls the connection of the application.

5 Claims, 9 Drawing Sheets

DATA COMMUNICATION SPEED CALCULATION UNIT

EXPRESSION 1: EXPRESSION FOR CALCULATING DATA COMMUNICATION SPEED FROM CQI

MAXIMUM DATA COMMUNICATION SPEED = CODE RATE × 1024 × NUMBER OF SENDING BITS PER SYMBOL × NUMBER OF FREE RBS / T_slot

MOBILE COMMUNICATION DEVICE AND MOBILE COMMUNICATION SYSTEM

INCORPORATION BY REFERENCE

The present application claims priority from Japanese applications JP2009-080862 filed on Mar. 30, 2009, the content of which is hereby incorporated by reference into this application.

BACKGROUND OF THE INVENTION

1. Field of the Invention

The present invention relates to a mobile communication technology, and more particularly to a mobile communication technology that uses the Orthogonal Frequency Division Multiplexing (OFDM) for the transmission method in a wireless section.

2. Description of Related Art

The widespread use of the Internet in the mobile communication field increases the need for high-speed web access and data communications including music and video. To meet this need, much effort is being made to study high-speed, broadband communications. One of the third-generation mobile communication systems is a 1×EV-DO (1× Evolution Data Optimized) system. The 1×EV-DO system uses the Code Division Multiple Access (CDMA) method for the transmission method in a wireless section. The 1×EV-DO Rev. A (Revision A) commercially available today provides the uplink communication speed of 1.8 Mbps and the downlink communication speed of 3.1 Mbps.

In addition, study is also being conducted on the application of the OFDM method, which is now used for a wireless LAN or digital broadcasting, to the mobile communication system. In the LTE (Long Term Evolution) system, one of the 3.9-generation mobile communication systems, the use of the OFDM method is already decided and the standardization work is being carried out. In addition, the fourth-generation mobile communication system IMT-Advanced (International Mobile Telecommunications-Advanced), which is the next generation communication system, also uses the OFDM method.

As compared with the CDMA method, the OFDM method uses the frequency more efficiently and ensures high-speed data transmission in a broadband system.

On the other hand, it is stipulated in the LTE standardization activity that the uplink data communication speed of 50 Mbps and the downlink data communication speed of 100 Mbps are possible in the 20 MHz bandwidth. The IMT-Advanced system is thought of as a system that will implement the downlink data communication speed of 1 Gbps in the 100 MHz bandwidth.

In the third-generation mobile communication system, the system is used primarily for the mail, web browsing service, and short-time video downloading. In the forthcoming 3.9-genration/4-generation mobile communication system, a larger amount of data communication is possible with focus on the long-time streaming services such as online movies and online games.

Unlike in the wired communication, a terminal is supposed to constantly move in the mobile communication. Because the quality of a wireless channel is subject to the landform of a place where the terminal is used, the interference waves such as reflective eaves from obstructions, and the other users who are in connection, the reception quality of the terminal may depends largely on the place where the terminal is used. Especially, when the user is receiving long-time streaming services such as online movies or online games described above, there is a possibility that, after a successful connection, the reception quality is too low to use the service, a drop in the reception quality during the service suddenly delays or even stops the data reception, or the communication is disconnected during the service, with the result that the user is highly dissatisfied. In this case, the ability for the user to know the serviceable communication quality before using the service, if available, wound allow the user to know the serviceable communication quality in advance and to judge whether to use the service. As a result, the user can use the service more reliably and feels satisfied.

When the required communication quality is not expected, it is expected that users will voluntarily refrain from using the communication services and, as a result, the base station will use the resources more efficiently. That is, if a user who has intended to view a movie from 10:00 PM gives up viewing it because of poor communication quality and releases the resources, other users will use the released resources and the general throughput of the base station will increase.

In today's mobile communication system, the reception level indicator and the out-of-area indicator are displayed as means for informing a mobile terminal user about the communication quality. However, the reception level indicator of a terminal only indicates the level of the waves received from the base station and, even when all antennas appear, it cannot be judged that the quality of data communication is good.

JP-A-2005-159486 and JP-A-2002-300644 disclose technologies for estimating not only the reception level of electric waves but also the data transmission speed of communication after a connection is established. JP-A-2002-300644 discloses a technology that estimates the data communication speed using the parameters specific to the 1×EVDO system and displays the data communication speed on a mobile terminal. Because the 1×EVDO system uses the CDMA method as the transmission method, this technology cannot be applied directly to the OFDM system.

In addition to the technologies described above, JP-A-2004-172907 discloses an invention in which a base station calculates an acceptable communication rate in response to a required communication rate notified by a mobile station.

SUMMARY OF THE INVENTION

For a service, such as an online movie service, that uses the resources continuously for a long time, the notification on the data communication speed, as well as the information as to how long the data communication speed will be maintained, is important and required information for the user when the user selects, and connects to, the service.

In view of the foregoing, it is an object of the present invention to provide a mobile communication device that can notify the user about the status of the communication equality, which varies greatly according to a place where the terminal is and a timing when the terminal is connected, and the length of time period during which the communication quality will be maintained.

To solve the problems described above, the present invention provides a mobile communication system including a plurality of terminals and a mobile communication device that sends data to the terminals via the orthogonal frequency division multiplexing method. The mobile communication device includes a mapping table in which information on a code rate and frequency sending efficiency is made to correspond to a communication quality index, the communication quality index being sent from the terminals based on a reception quality of a reference signal sent to the terminals; and a resource management unit that, for wireless resource blocks, manages a number of resource blocks already allocated to terminals and a number of free resource blocks, the wireless resource blocks being resource blocks that the mobile communication device can allocate to terminals. The mobile communication device further includes a data communication speed calculation unit that, based on an application start request from a terminal, refers to information on the number of free resource blocks, managed by the resource management unit, and the mapping table for calculating a data communication speed based on the communication quality index, the code rate, and the frequency sending efficiency received from the terminal; a statistical traffic amount calculation unit that performs a statistical calculation by collecting traffic amounts, sent from the mobile communication device to terminals, and calculates a statistical value of a traffic amount of the mobile communication device during each hour of the 24 hours of a day; a number of free resource blocks conversion unit that calculates a statistical value of a number of free resource blocks during each hour of the 24 hours of a day from the statistical value of the traffic amount; a maintaining time calculation unit that calculate an estimated maintaining time of the data communication speed, calculated by the data communication speed calculation unit, from the statistical value of free resource blocks calculated by the number of free resource blocks conversion unit; and a sending unit that sends the data communication speed and the maintaining time to the terminals. Each of the terminals includes a control unit that controls parts; and a display unit, wherein the control unit displays on the display unit the data communication speed and the maintaining time, sent from the mobile communication device, and information prompting a user to select whether or not a start of the application is to be continued and, based on a selection result of the user, controls a connection of the application.

In accordance with the present invention, it becomes possible to notify a user in advance about the communication quality status, that changes greatly according to the location of a terminal and a connection timing, as well as its maintaining time. The information notified in this way allows the user to easily find a location and a time suitable for data communication, thus providing the user with satisfactory streaming data communication services.

Other objects, features and advantages of the invention will become apparent from the following description of the embodiments of the invention taken in conjunction with the accompanying drawings.

DESCRIPTION OF THE EMBODIMENTS

Figure 1:
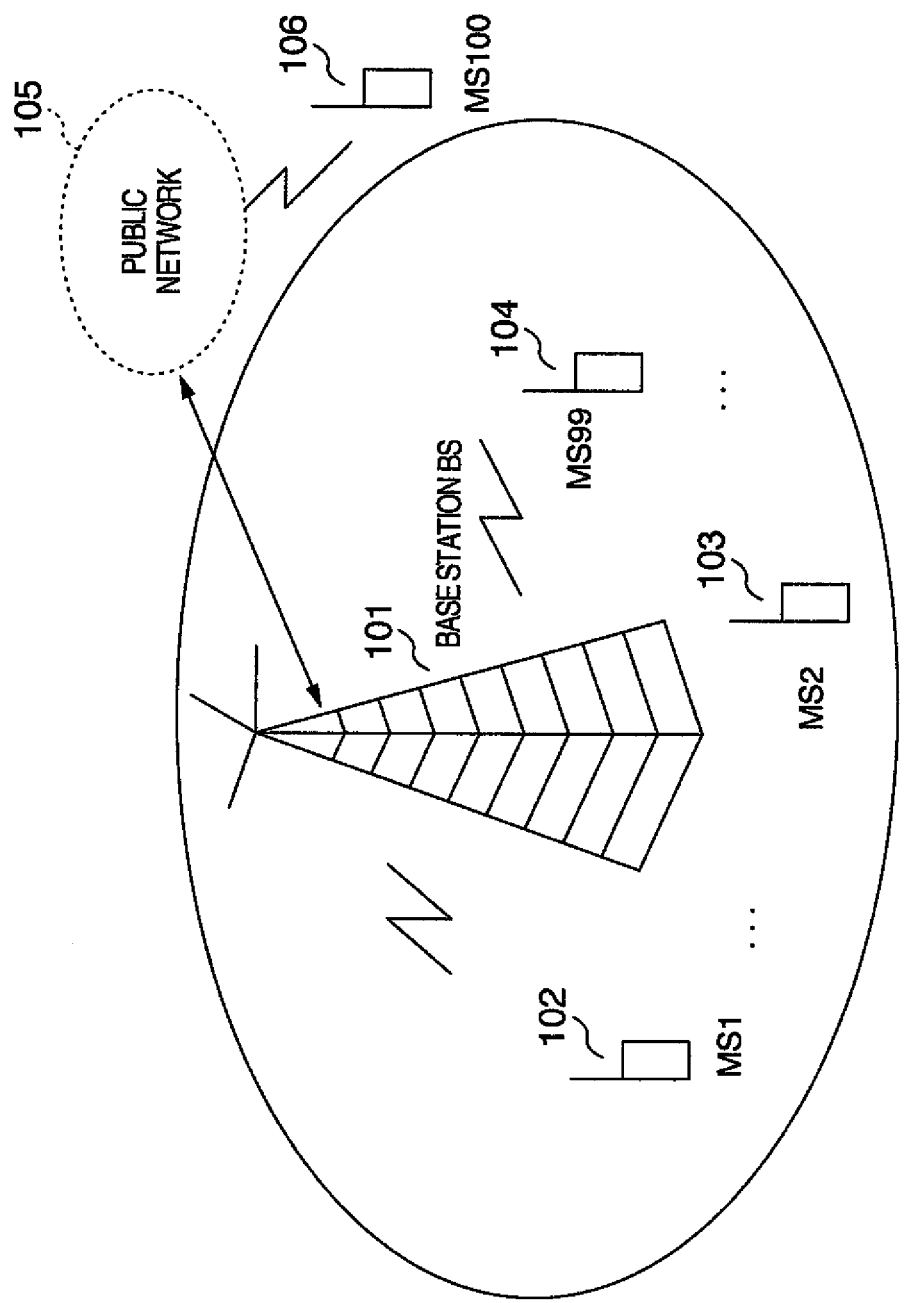
FIG. 1 is a diagram showing the general configuration of a mobile communication system.

Referring to the drawings, the present invention will be described in detail below based on the embodiment of the invention.

FIG. 1 is a diagram showing the general configuration of a mobile communication system.

In the range covered by a base station (BS) 101, there are a mobile station (MS) 1 102, MS2 103, and MS99 104. The mobile stations MS1 102 can communicate with a mobile station MS100 106 in a range covered by another base station via the base station 101 and a public network 105.

Figure 2:
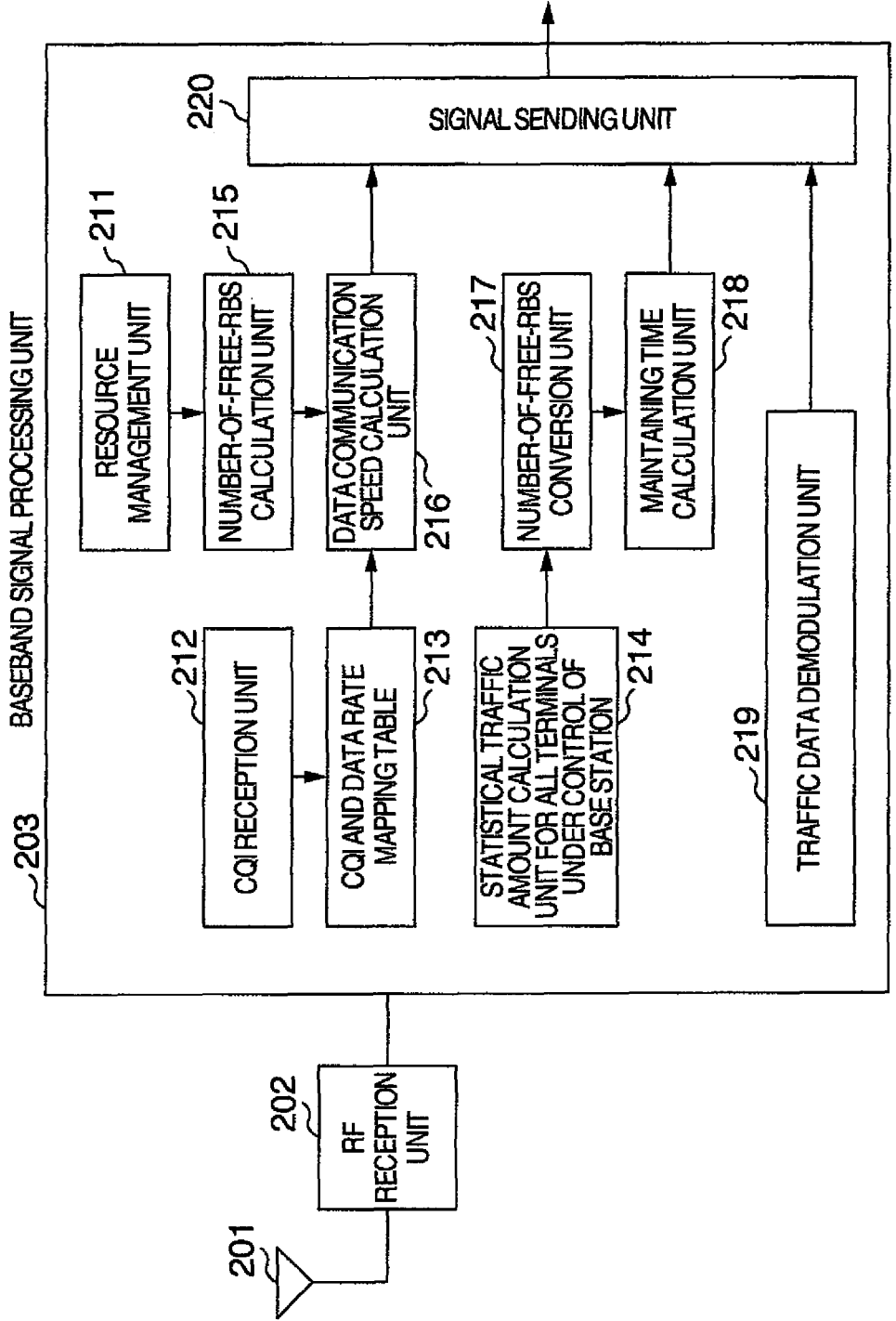
FIG. 2 is a diagram showing the hardware configuration of the receiver of a base station.

FIG. 2 is a diagram showing the hardware configuration of the receiver of the base station.

The receiver of the base station includes an antenna 201 that receives radio signals; an RF reception unit 202 that converts the received radio signals from analog to digital and converts high-frequency signals to baseband signals; and a baseband signal processing unit 203 that performs the signal processing such as the demodulation of the baseband signals received from the RF reception unit.

The baseband signal processing unit 203 includes a resource management unit 211 that manages resource blocks (RB) that the base station can allocate to terminal(s); a number-of-free-RBs calculation unit 215 that calculates the number of free RBs at a given timing based on the resource blocks managed by the resource management unit; a data communication speed calculation unit 216 that calculates the communication speed based on the information received from the number-of-free-RBs calculation unit and the data rate mapping table; a statistical traffic amount calculation unit 214 that accumulates the log of data traffic sent to the terminals of the base station and calculates the statistical value of the traffic amount; a number-of-free-RBs conversion unit 217 that converts the number of free RBs based on the output of the statistical traffic amount calculation unit and the information on the in-use RBs; a maintaining time calculation unit 218 that calculates the expected maintaining time of the data communication speed, calculated by the data communication speed calculation unit, based on the output information from the number-of-free-RBs conversion unit; a traffic data demodulation unit 219 that demodulates traffic data received from the terminals; and a signal sending unit 220 that sends the information on the data communication speed and maintaining time output from the blocks, as well as the traffic data, to a terminal.

Figure 3:
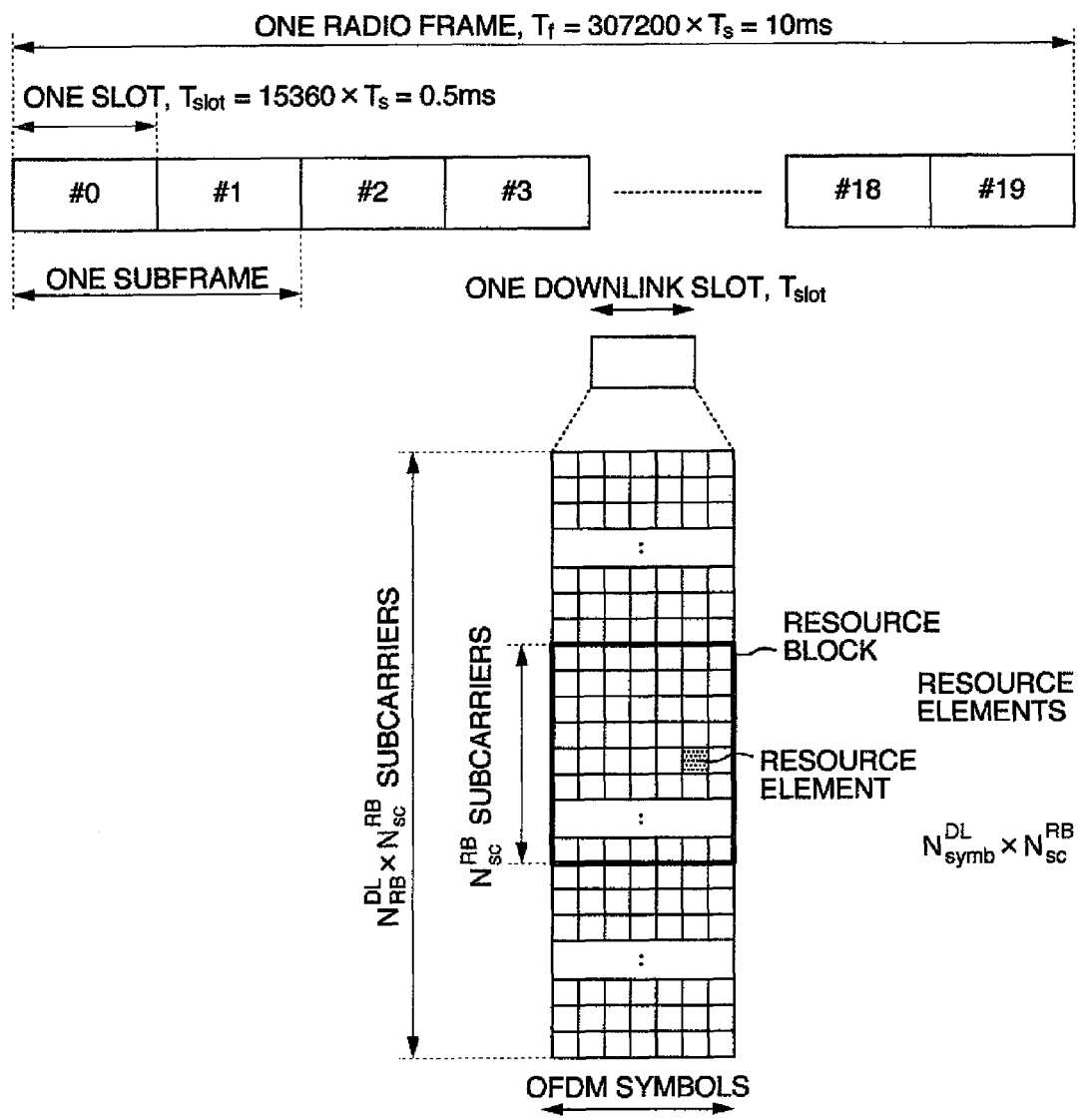
FIG. 3 is a diagram showing the configuration of a communication frame of an LTE downlink system and an RB unit.

FIG. 3 is a diagram showing the configuration of a downlink radio frame and the configuration unit of an RB.

FIG. 3 shows, as an example, the configuration of a downlink communication frame and the configuration of an RB used in an LTE system. The configuration is almost similar in OFDM-based systems other than an LTE system.

As shown in the upper half of FIG. 3, one radio frame is composed of 10 subframes. One subframe is composed of two time slots. In the upper half of FIGS. 3, #0 to #19 represent time slots.

The lower half of the figure shows the configuration of each time slot.

One time slot is composed of seven OFDM symbols on the time axis (horizontal axis in the lower half of FIG. 3). On the frequency axis (vertical axis in the lower half of FIG. 3), one time slot is composed of subcarriers and the number of subcarriers are shown in Expression 1.

$$N_{RB}^{DL} * N_{sc}^{RB} \quad \text{[Expression 1]}$$

$$N_{RB}^{DL} \quad \text{[Expression 2]}$$

The Expression 2 represents the number of RBs of downlink data communication and $$N_{sc}^{RB} \quad \text{[Expression 3]}$$

The Expression 3 represents the number of subcarriers of each RB. In expression 2 and expression 3, N indicates Number, DL indicates a downlink line, sc indicates a subcarrier, and symb indicates a symbol.

Table 1 shows Channel Quality Indicator (CQI) to data rate mapping table.

TABLE 1

Channel Quality Indicator (CQI) to Data Rate Mapping Table

| CQI Index | Number of sending bits per symbol | Modulation | Code Rate × 1024 | Efficiency |
|---|---|---|---|---|
| 0 | 0 | | Out of Range | |
| 1 | 2 | QPSK | 78 | 0.1523 |
| 2 | 2 | QPSK | 120 | 0.2344 |
| 3 | 2 | QPSK | 193 | 0.3770 |
| 4 | 2 | QPSK | 308 | 0.6016 |
| 5 | 2 | QPSK | 449 | 0.8770 |
| 6 | 2 | QPSK | 602 | 1.1758 |
| 7 | 4 | 16QAM | 378 | 1.4766 |
| 8 | 4 | 16QAM | 490 | 1.9141 |
| 9 | 4 | 16QAM | 616 | 2.4063 |
| 10 | 6 | 64QAM | 466 | 2.7305 |
| 11 | 6 | 64QAM | 567 | 3.3223 |
| 12 | 6 | 64QAM | 666 | 3.9023 |
| 13 | 6 | 64QAM | 772 | 4.5234 |
| 14 | 6 | 64QAM | 873 | 5.1152 |
| 15 | 6 | 64QAM | 948 | 5.5547 |

Table 1 shows an example of the table used in an LTE system. Other OFDM-based systems also have a table similar to this table.

In Table 1, the CQI is divided into 16 levels according to the channel quality and 0 to 15 CQI indexes are assigned to those levels, respectively. Out of those indexes, each data rate is assigned to CQI indexes 1 to 15. In the table shown in Table 1, the number of sending bits per symbol, modulation method, code rate (code rate×1024), and sending efficiency are stored for each CQI index. The number of sending bits per symbol depends on the modulation method.

The smaller the CQI is, the poorer the channel sending/receiving quality is. That is, when the channel radio status is bad, the number of sending bits per symbol is reduced. For example, the number of sending bits per symbol is two bits per symbol for the QPSK (Quadrature Phase Shift Keying) modulation, four bits per symbol for 16QAM (16-position Quadrature Amplitude Modulation), and six bits per symbol for 64QAM (64-position Quadrature Amplitude Modulation). This means that a smaller CQI indicates a lower code rate and poorer sending efficiency. In the Code Rate column of Table 1, a value produced by multiplying the value of the code rate by 1024 is stored.

Figure 4:
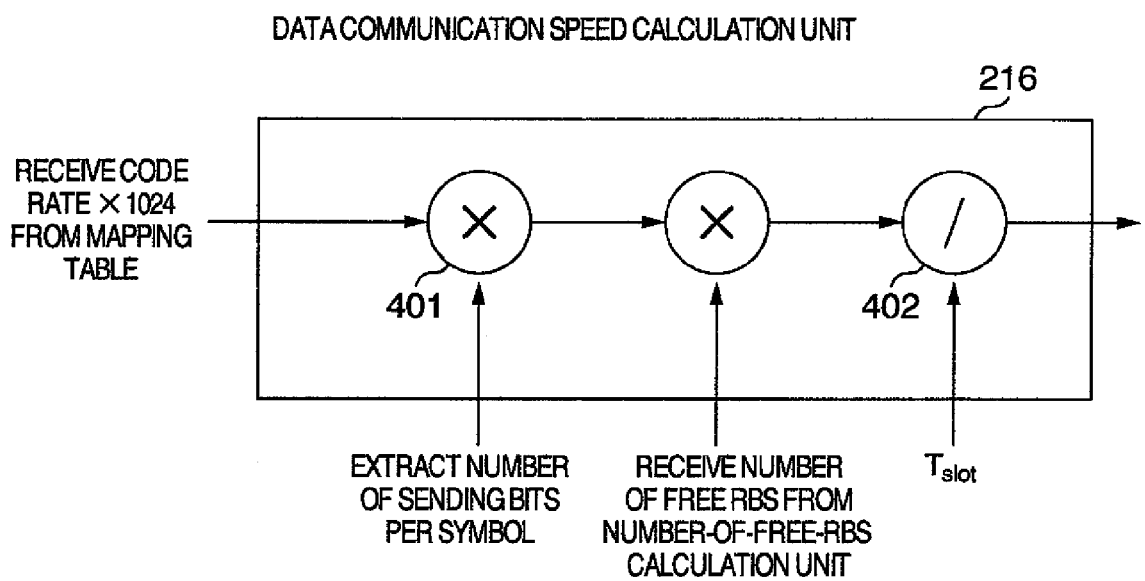
FIG. 4 is a diagram showing the configuration of a data communication speed calculation unit.

FIG. 4 is a diagram showing the configuration of the data communication speed calculation unit of the base station.

The data communication speed calculation unit 216 includes multipliers and a divider. The data communication speed calculation unit 216 receives the values of the codes rates (Code Rate×1024) and the sending efficiency (Efficiency) from the CQI and data rate mapping table and, based on the number of free RBs received from the number-of-free-RBs calculation unit, carries out the calculation shown in Expression 4. In the expression, T_slot indicates the time length of one slot.

Maximum data communication speed=Code rate× 1024×Number of sending bits per symbol×Number of free RBs/T-slot. (Expression 4)

Figure 5:
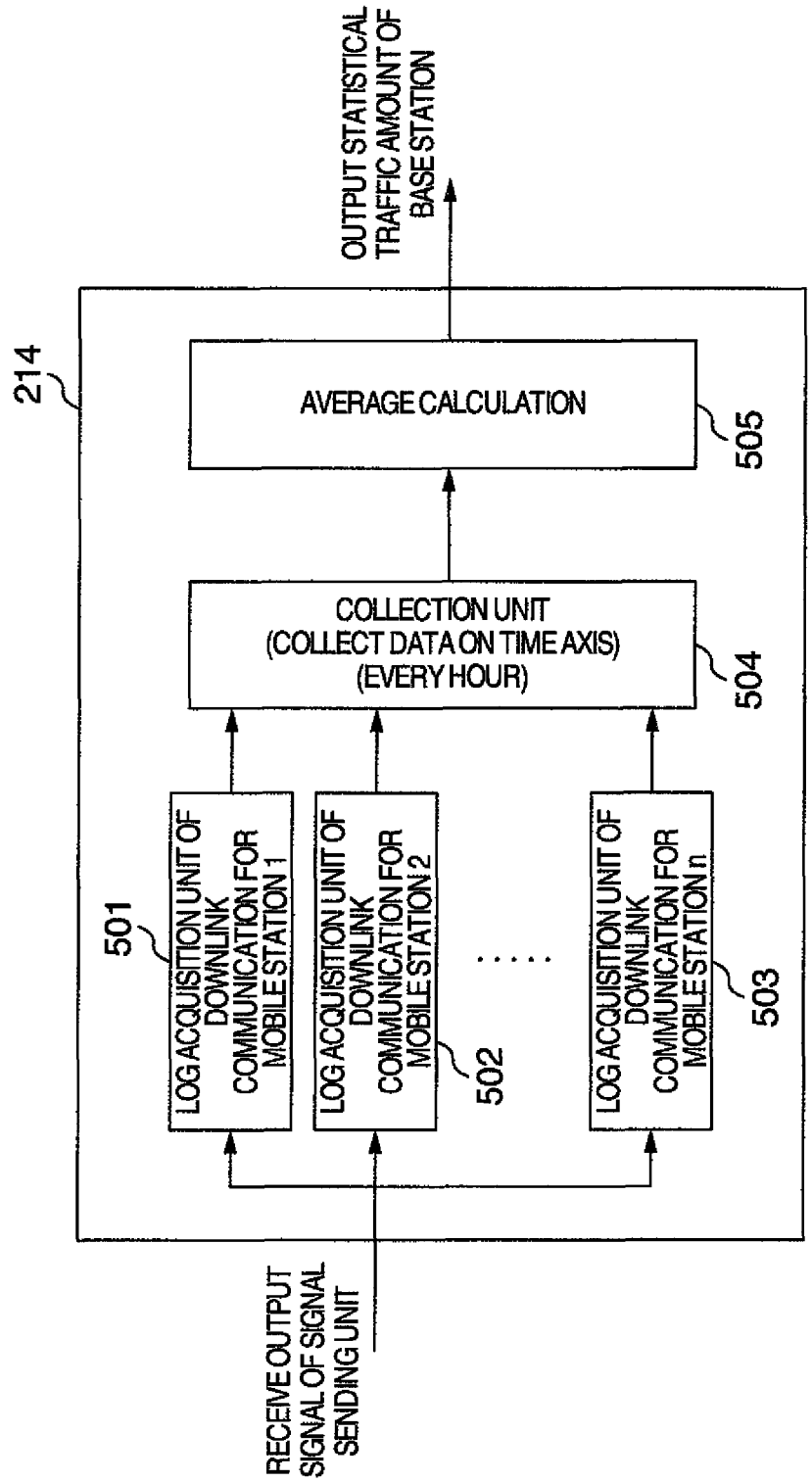
FIG. 5 is a diagram showing the configuration of a statistical traffic amount calculation unit.

FIG. 5 is a diagram showing the configuration of the statistical traffic amount calculation unit.

The statistical traffic amount calculation unit 214 records the log of traffic of data, which are sent by the signal sending unit 220 to the terminals, in log acquisition units (501, 502,) provided for each terminal. Next, the statistical traffic amount calculation unit 214 calculates the total of the amounts of traffic sent to the each terminal (504) on an hourly basis, and calculates the average of the collected traffic amounts, for example, on a weekly basis (505). The averaged traffic amount is output as data on the time axis every hour (for example, in the range of 24 hours).

Figure 6:
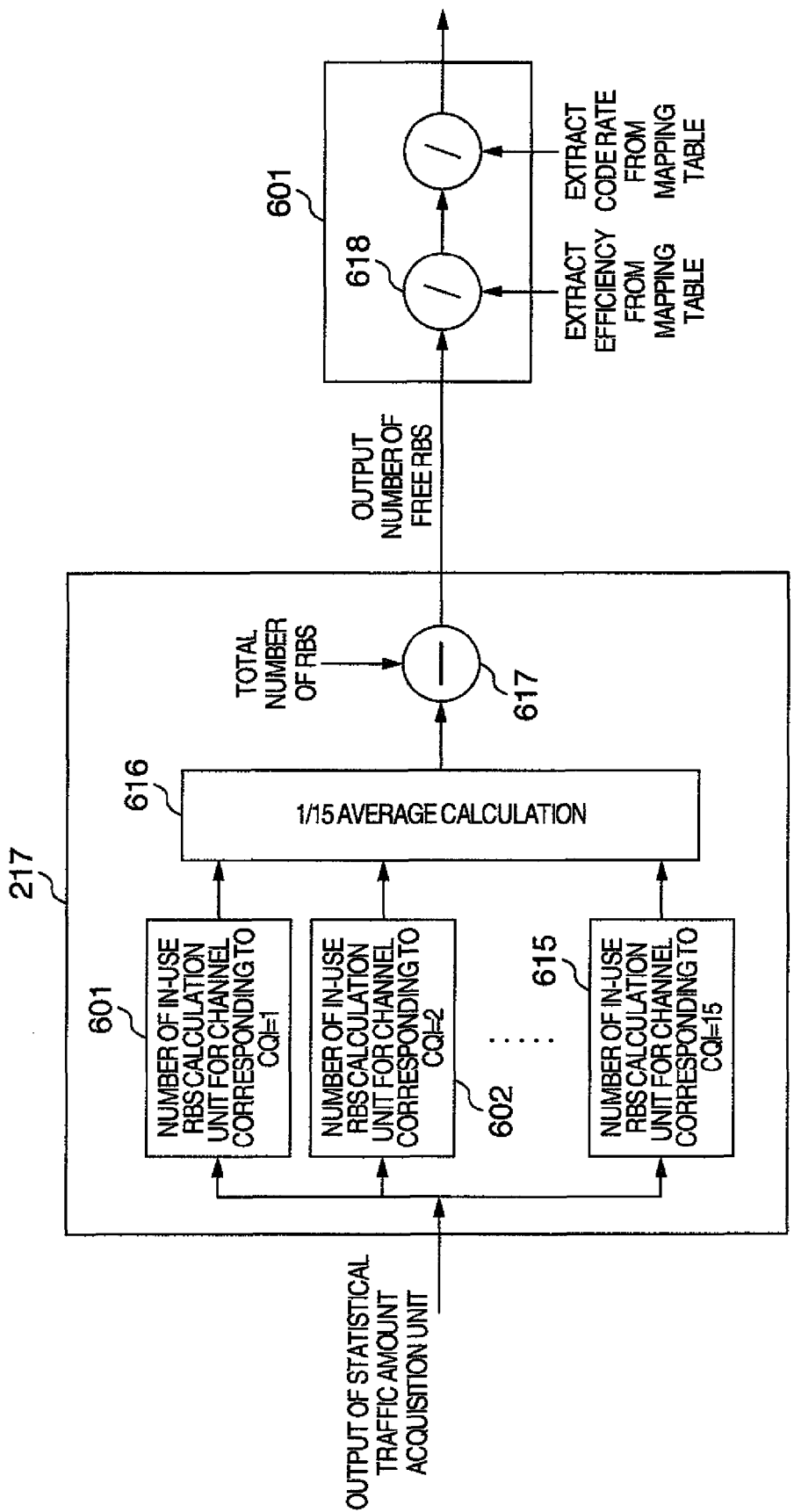
FIG. 6 is a diagram showing the configuration of a number-of-free-RBs conversion unit.

FIG. 6 is a diagram showing the configuration of the number-of-free-RBs converter.

The number-of-free-RBs conversion unit 217 receives the statistical traffic amount, output from the statistical traffic amount calculation unit 214, at a timing when a terminal is connected. The number-of-free-RBs conversion unit 217 has calculation units (601, 602, 603, . . . ) to calculate the number of in-use RBs of the channel corresponding to each of CQI index=1 to CQI index=15. The numbers of in-use RBs of the channels corresponding to CQI index=1 to CQI index=15, which are calculated by the calculation units (601, 602, 603, . . . ), are sent to an average unit 616 that calculates the average. "1/15" in the average processing indicates the average of the numbers of in-use RBs from the CQI index=1 to CQI index=15. After that, the averaged result is subtracted from the total number of RBs of the base station by means of a subtractor 617 to output the number of remaining RBs that is the number of free RBs.

The calculation units 601, 602, . . . , 615, used to calculate the number of in-use RBs for the channels corresponding to the CQIs, perform the internal operation using three continuous dividers.

More specifically, the calculation is performed as follows.

Number of free RBs 1=Traffic amount/Efficiency (of CQI=1)/Code rate×1024 (of CQI=1) (Expression 5)

Number of free RBs 2=Traffic amount/Efficiency (of CQI=2)/Code rate×1024 (of CQI=2) (Expression 6)

Number of free RBs 15=Traffic amount/Efficiency (of CQI=15)/Code rate×1024 (of CQI=15) (Expression 7)

The calculation in the subtractor 617 is carried out by (Expression 8) given below.

Number of free RBs=Total number of RBs−[number of free BRs 1+number of free BRs 2+ . . . +number of free BRs 15]/15 (Expression 8)

Figure 7:
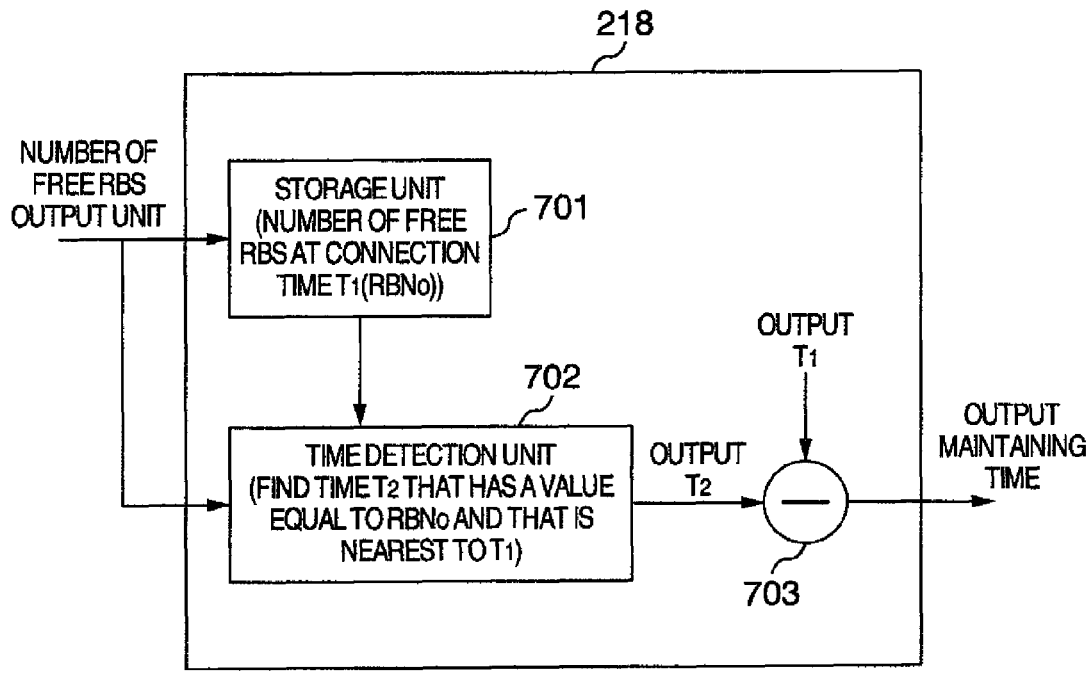
FIG. 7 is a diagram showing the configuration of a maintaining time calculation unit.

FIG. 7 is a diagram showing the configuration of the maintaining time calculation unit.

Figure 10:
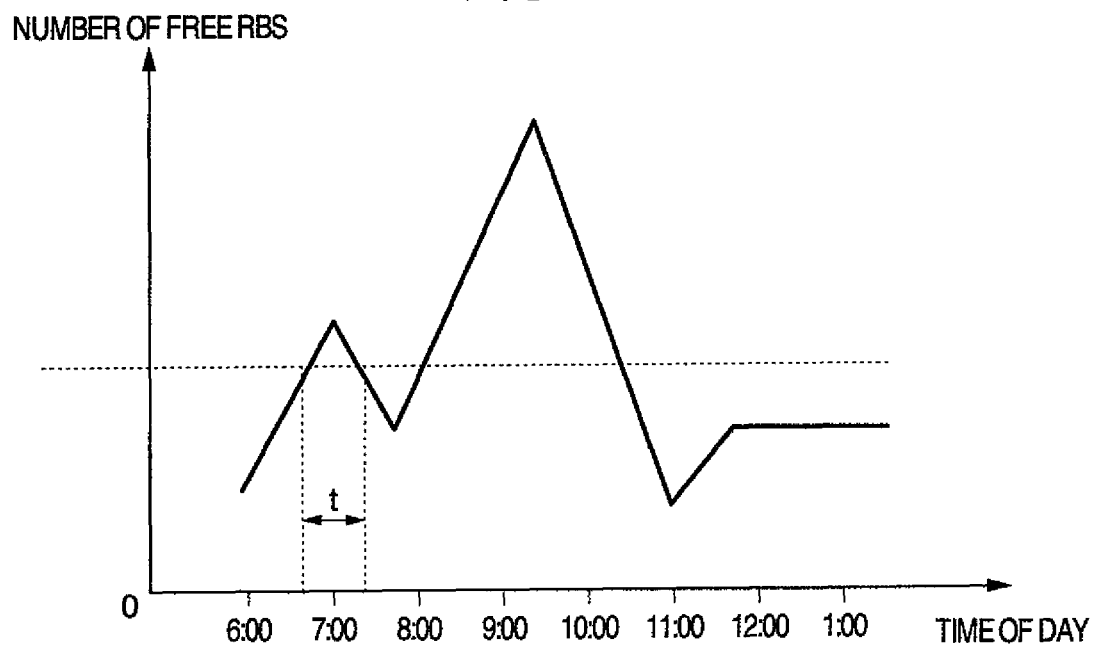
FIG. 10 is a diagram showing an example of the method for estimating the data communication speed maintaining time from the number of free RBs.

The maintaining time calculation unit 218 includes a storage unit 701, which stores the output of the number-of-free-RBs calculation unit 215 and the corresponding output time information, and a time detection unit 702. The information on the number of free RBs and the information on the time, stored in the storage unit 701, are represented by the graph as shown in FIG. 10.

The time detection unit 702 checks the information stored in the storage unit 701 to detect the time T1 which is a later time on the time axis after the terminal connection time T0 and at which the number of free RBs becomes equal to the number of free RBs calculated at the terminal connection time T0 (output value of number-of-free-RBs calculation unit). The maintaining time is calculated by subtracting the connection time T0 from the time T1 at which it is detected. The maintaining time calculation unit 218 outputs the maintaining time calculated by this calculation.

Figure 8:
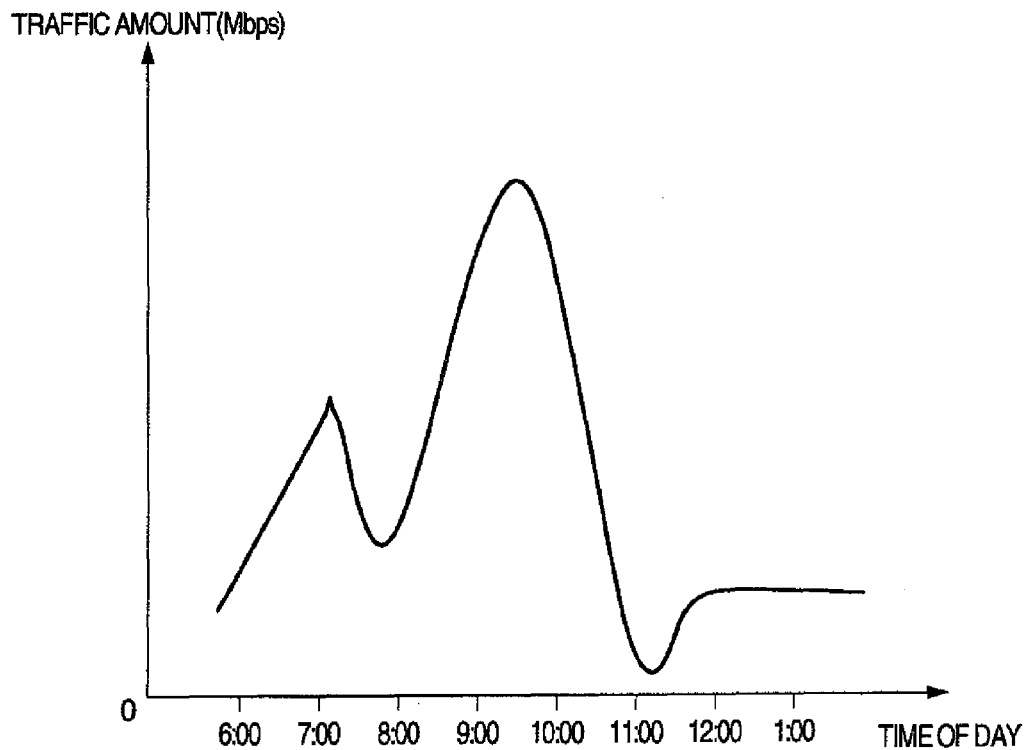
FIG. 8 is a diagram showing an example of the temporal transition of traffic amounts acquired by a base station.

FIG. 8 is a diagram showing a temporal change in the traffic amounts acquired by a base station in an average week.

In FIG. 8, the horizontal axis indicates the hours, and the vertical axis indicates the total of the traffic amounts of all terminals under control of the base station at each hour. FIG. 8 is a graph showing the output of the statistical traffic amount calculation unit.

Figure 9:
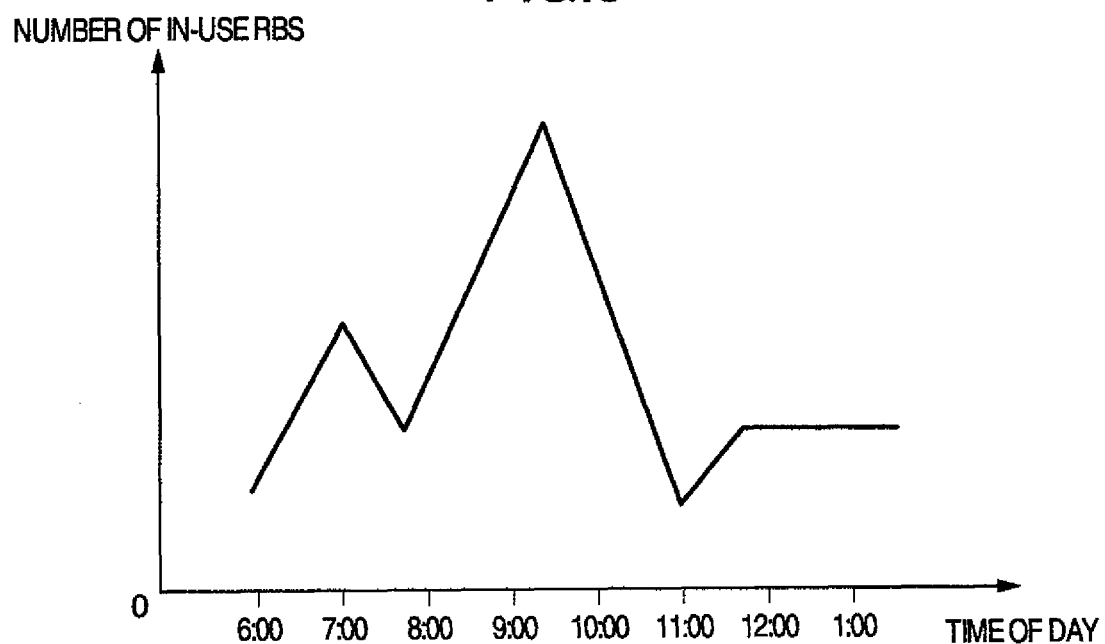
FIG. 9 is a diagram showing an example of the temporal transition of the number of in-use RBs calculated based on the traffic amount of a base station.

FIG. 9 is a diagram showing the number of in-use RBs calculated based on the statistical traffic amount of all terminals under control of a base station.

FIG. 9 is a graph showing the number of in-use RBs calculated based on the statistical traffic amount shown in FIG. 8. In FIG. 9, the horizontal axis indicates the hours, and the vertical axis indicates the number of in-use RBs. In FIG. 9, the output from the average unit 616 of the number-of-free-RBs conversion unit 217 is represented as a graph.

FIG. 10 is a diagram showing how the maintaining time calculation unit estimates the maintaining time of the data communication speed.

The maintaining time calculation unit 218 calculates the number of free RBs from the number of in-use RBs, calculated based on the statistical traffic amount shown in FIG. 9, and estimates the maintaining time of the data communication speed from the calculated number of free RBs.

More specifically, as described in the configuration of the maintaining time calculation unit 218 in FIG. 7, the maintaining time calculation unit 218 stores the output of the number-of-free-RBs conversion unit 217 at the connection time and detects the time T1 which is later than the connection time T0 on the time axis and at which the output value of the number-of-free-RBs conversion unit becomes equal to the output value at the connection time. And, the connection time T0 is subtracted from the time T1, at which it is detected, to produce the maintaining time.

Next, using an LTE system as an example, the following describes the sequence in which a terminal asks the base station for the communication quality status before using various application services. The actual messages names are used in the description.

Figure 11:
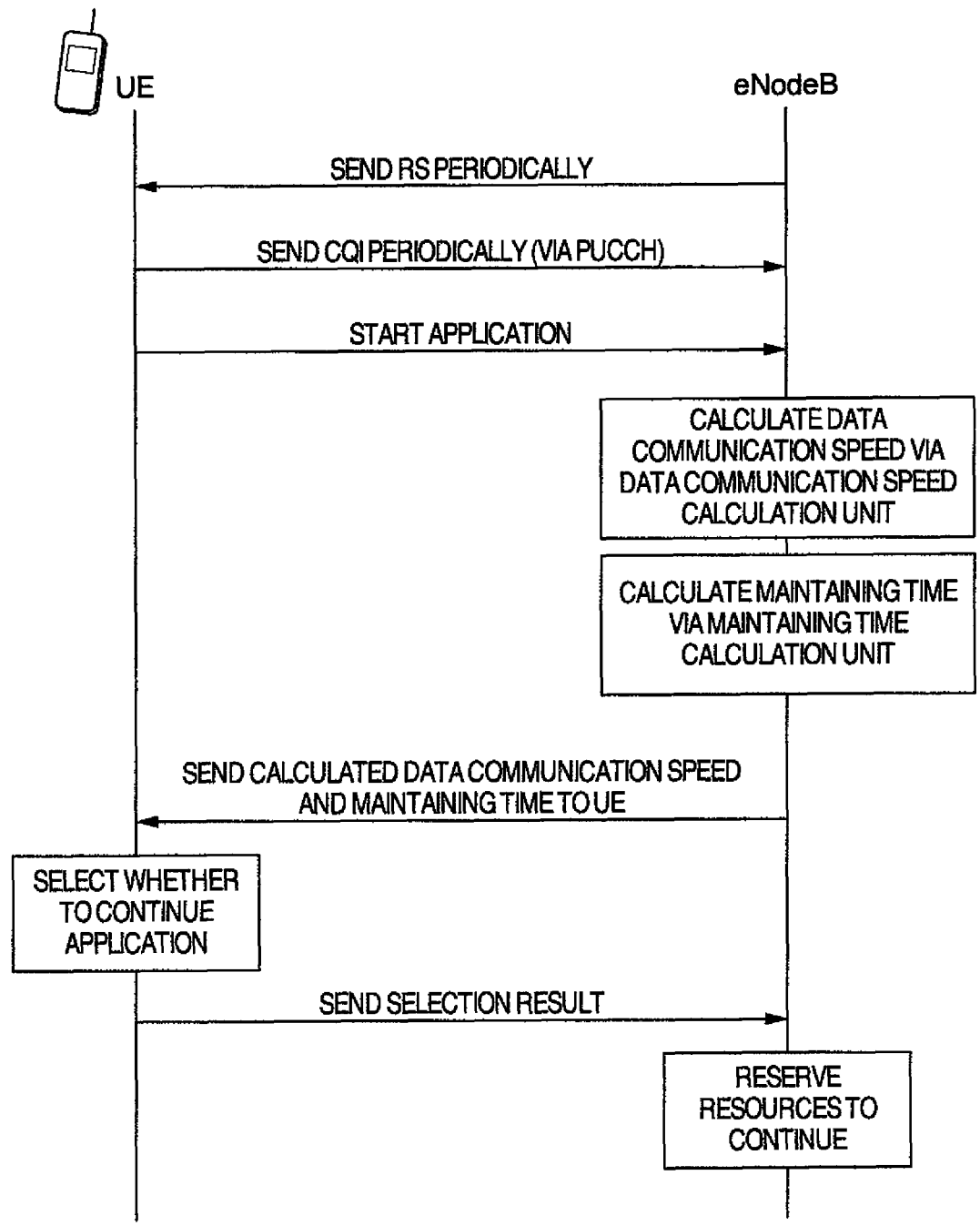
FIG. 11 is a diagram showing the sequence in which a terminal asks the base station about the service quality status.

FIG. 11 is a sequencer diagram showing the sequence in which a terminal asks the base station for the service quality status before using various application services.

In FIG. 11, using the terminologies defined by the LTE standardization are used, the terminal is indicated by UE (User Equipment) and the base station is indicated by eNodeB (evolved Node B).

The UE and the eNodeB are continually communicating notification information with each other. The eNodeB periodically sends the RS(Reference Signal) signal, which corresponds to the pilot signal, to the UE. The UE receives the RS signal, demodulates the received RS signal to produce CQI, and sends the produced CQI to the eNodeB via Public Uplink Control Channel (PUCCH). When the user starts an application service such as an online movie or an online game, the UE sends the Indication of the application service to the eNodeB. The eNodeB calculates the data communication speed via the data communication speed calculation unit and calculates the maintaining time via the maintaining time calculation unit. The eNodeB sends the calculated result (data communication speed, maintaining time) to the UE. The UE displays the information, received from the eNodeB, on the display unit. The user refers to this display, selects whether to continue to activate the application service or to deactivate the application, and then enters the selection result. For example, the user who intended to see a movie gives up activating the application service because the data communication speed is not high enough to receive the movie. Alternatively, the user may also select to continue to activate the application service even when the data communication speed is not so high.

The information on the communication speed and the maintaining time of that communication speed are sent to the user. This allows the user to decide to deactivate the application because, though the communication speed is high, the maintaining time of the communication speed is shorter than the playing time of the movie.

If the UE sends an instruction to the eNodeB to notify that the application service will not be continued, the eNodeB terminates the communication with the UE. Conversely, if the UE sends an instruction to the eNodeB to notify that the application service will be continued, the eNodeB reserves the resources for the UE and activate the application service.

Although the base station includes the data communication speed calculation unit, statistical traffic amount calculation unit, and maintaining time calculation unit in the example of the embodiment described above, it is also possible to provide a device separate from the base station and to send the required parameters to that device to cause it to calculate the data communication speed, statistical traffic amount, and maintaining time.

It is also possible to provide a device which is at a level higher than a base station and which has the function to calculate the data communication speed, statistical traffic amount, and maintaining time for integrally managing the information on multiple base stations. When a terminal is moving, such a configuration allows the device to calculate the information on the data communication speed and the marinating time, which will be sent to a terminal, considering the data communication speed, statistical traffic amount, and maintaining time on both old and new base stations.

It should be further understood by those skilled in the art that although the foregoing description has been made on embodiments of the invention, the invention is not limited thereto and various changes and modification may be made without departing from the spirit of the invention and the scope of the appended claims.

The invention claimed is:

1. A mobile communication device configured to send data to terminals via an orthogonal frequency division multiplexing method, comprising:
a mapping table in which information on a code rate and frequency sending efficiency is made to correspond to a communication quality index, said communication quality index being sent from the terminals based on a reception quality of a reference signal sent from said mobile communication device to the terminals;
a resource management unit configured to, for wireless resource blocks that said mobile communication device can allocate to the terminals, manage a number of resource blocks already allocated to the terminals and a number of free resource blocks;

a data communication speed calculation unit configured to, in response to a request from the terminals, refer to information on the number of free resource blocks managed by said resource management unit, and said mapping table, and calculate a data communication speed based on the communication quality index, the code rate, and the frequency sending efficiency received from the terminal;

a statistical traffic amount calculation unit configured to perform a statistical calculation by collecting traffic amounts sent from said mobile, and to calculate a statistical value of a traffic amount of said mobile communication device during each hour of the 24 hours of a day;

a free resource blocks conversion unit configured to calculate a statistical value of the number of free resource blocks during each hour of the 24 hours of a day from the statistical value of the traffic amount;

a maintaining time calculation unit configured to calculate an estimated maintaining time of the data communication speed, calculated by said data communication speed calculation unit, from the statistical value of free resource blocks calculated by said free resource blocks conversion unit; and a sending unit configured to send the data communication speed and the maintaining time to the terminal;

wherein when the terminals are newly connected to the mobile communication device, said data communication speed calculation unit is configured to calculate the data communication speed, said maintaining time calculation unit is configured to calculate the maintaining time for maintaining the data communication speed when the terminals are newly connected, by referring to the statistical value of the number of free resource blocks during each hour of the 24 hours of the day, and the sending unit is configured to send, to the newly connected terminals, a data communication speed and the maintaining time for maintaining the data communication speed; and wherein said data communication speed calculation unit is configured to refer to said mapping table to acquire the code rate and the frequency sending efficiency corresponding to the communication quality index sent from the terminals and calculate the data communication speed based on an expression expressed by data communication speed=code rate×frequency sending efficiency×number of free resource blocks/unit time.

2. The mobile communication device according to claim 1, wherein said statistical traffic amount calculation unit is configured to perform the statistical calculation of traffic amounts by acquiring and collecting logs of traffic, sent from said mobile communication device to the terminals on a terminal basis, to calculate a total value of a traffic amount during each hour of the 24 hours of a day, and to calculate an average of traffic during each hour for a predetermined period.

3. A mobile communication system comprising:

a plurality of terminals, each of said terminals comprising a control unit that control parts; and a mobile communication device configured to send data to said terminals via an orthogonal frequency division multiplexing method, including:

a mapping table in which information on a code rate and frequency sending efficiency is made to correspond to a communication quality index, said communication quality index being sent from the terminals based on a reception quality of a reference signal sent to the terminals; and a resource management unit configured to, for wireless resource blocks that said mobile communication device can allocate to the terminals, manage a number of resource blocks already allocated to terminals and a number of free resource blocks;

a data communication speed calculation unit configured to, based on an application start request from a terminal of the terminals, refer to information on the number of free resource blocks, managed by said resource management unit, and said mapping table, and calculate a data communication speed based on the communication quality index, the code rate, and the frequency sending efficiency received from the terminal;

a statistical traffic amount calculation unit configured to perform a statistical calculation by collecting traffic amounts sent from said mobile communication device to the terminals, and configured to calculate a statistical value of a traffic amount of said mobile communication device during each hour of the 24 hours of a day;

a free resource blocks conversion unit configured to calculate a statistical value of the number of free resource blocks during each hour of the 24 hours of a day from the statistical value of the traffic amount;

a maintaining time calculation unit configured to calculate an estimated maintaining time of the data communication speed, calculated by said data communication speed calculation unit, from the statistical value of free resource blocks calculated by said free resource blocks conversion unit;

a sending unit configured to send the data communication speed and the maintaining time to the terminals, wherein when the terminals are newly connected to the mobile communication device, said data communication speed calculation unit is configured to calculate the data communication speed, said maintaining time calculation unit is configured to calculate the maintaining time for maintaining the data communication speed when the terminals are newly connected, by referring to the statistical value of the number of free resource blocks during each hour of the 24 hours of the day; and a display unit, wherein said control unit is configured to display on said display unit the data communication speed and the maintaining time sent from the mobile communication device, and information for prompting a user to select whether or not activation of the application will continue and said control unit controls a connection of the application based on the selection of the user wherein said data communication speed calculation unit is configured to refer to said mapping table to acquire the code rate and the frequency sending efficiency corresponding to the communication quality index sent from the terminals and is configured to calculate the data communication speed based on an expression expressed by data communication speed=code rate×frequency sending efficiency×number of free resource blocks/unit time.

4. The mobile communication system according to claim 3, wherein said statistical traffic amount calculation unit is configured to perform the statistical calculation of traffic amounts by acquiring and collecting logs of traffic, sent from said mobile communication device to terminals, on a terminal basis, to calculate a total value of a traffic amount during each hour of the 24 hours of a day, and to calculate an average of traffic during each hour for a predetermined period.

5. The mobile communication system according to claim 4, wherein said maintaining time calculation unit is configured to calculate the maintaining time by referring to the statistical value of the number of free resource blocks during each hour of the 24 hours of the day corresponding to a reception time of a request from the terminals, calculated by said free resource blocks conversion unit, and to calculate a time period during which the statistical value of the number of free resource blocks equal to or higher than the statistical value of the number of free resource blocks at the reception time of the request from the terminals will continue.

* * * * *